United States Patent

Sumioka

(10) Patent No.: US 10,097,701 B2
(45) Date of Patent: Oct. 9, 2018

(54) INFORMATION PROCESSING APPARATUS AND CONTROL METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kazuo Sumioka, Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/207,703

(22) Filed: Jul. 12, 2016

(65) Prior Publication Data

US 2017/0155775 A1  Jun. 1, 2017

(30) Foreign Application Priority Data

Nov. 30, 2015 (JP) ................. 2015-233991

(51) Int. Cl.
*H04N 1/00* (2006.01)
*G06K 9/00* (2006.01)

(52) U.S. Cl.
CPC ..... *H04N 1/00074* (2013.01); *G06K 9/00268* (2013.01); *H04N 1/00037* (2013.01); *H04N 1/00336* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2008/0010079 A1* | 1/2008 | Genda | ............... | H04N 1/00326 358/1.15 |
| 2011/0279844 A1* | 11/2011 | Urasawa | ............... | G03G 15/55 358/1.13 |
| 2012/0050769 A1* | 3/2012 | Houjou | ............... | G06K 9/00221 358/1.9 |
| 2015/0378296 A1* | 12/2015 | Kim | ............... | G03G 15/5091 399/80 |
| 2016/0127582 A1* | 5/2016 | Sawa | ............... | H04N 1/00336 358/1.14 |

FOREIGN PATENT DOCUMENTS

JP 2006-187944 7/2006
JP 2006187944 A * 7/2006

* cited by examiner

*Primary Examiner* — Fan Zhang
(74) *Attorney, Agent, or Firm* — Amin, Turocy & Watson LLP

(57) ABSTRACT

In accordance with an embodiment, an information processing apparatus comprises an imaging device configured to acquire a peripheral image of the information processing apparatus; a storage device configured to store maintenance information indicating a status of the apparatus for a maintenance; a notification device; a controller configured to detect a face of a person based on the peripheral image acquired by the imaging device, determine whether the detected person is a manager of the information processing apparatus, and control the notification device to inform the maintenance information read from the storage device if the detected person is determined as the manager of the information processing apparatus.

12 Claims, 5 Drawing Sheets

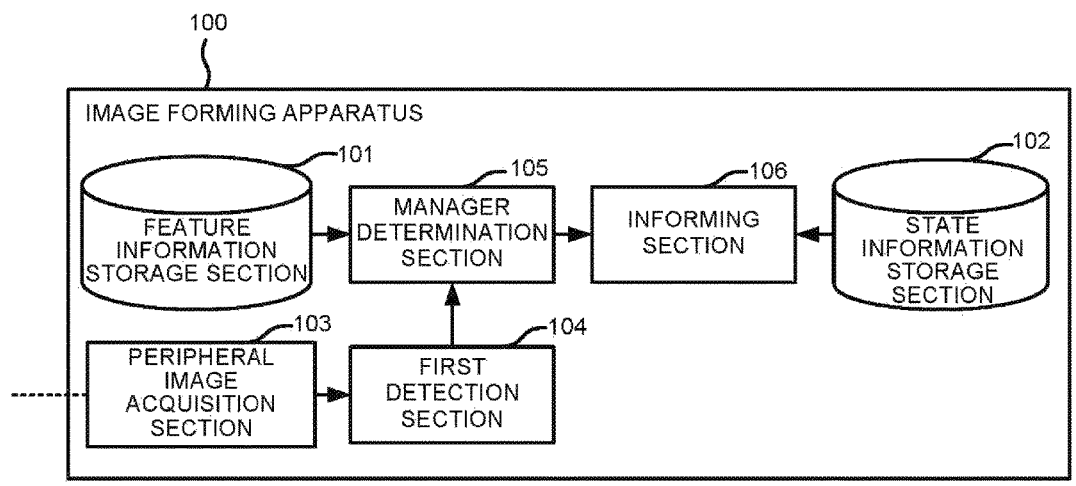

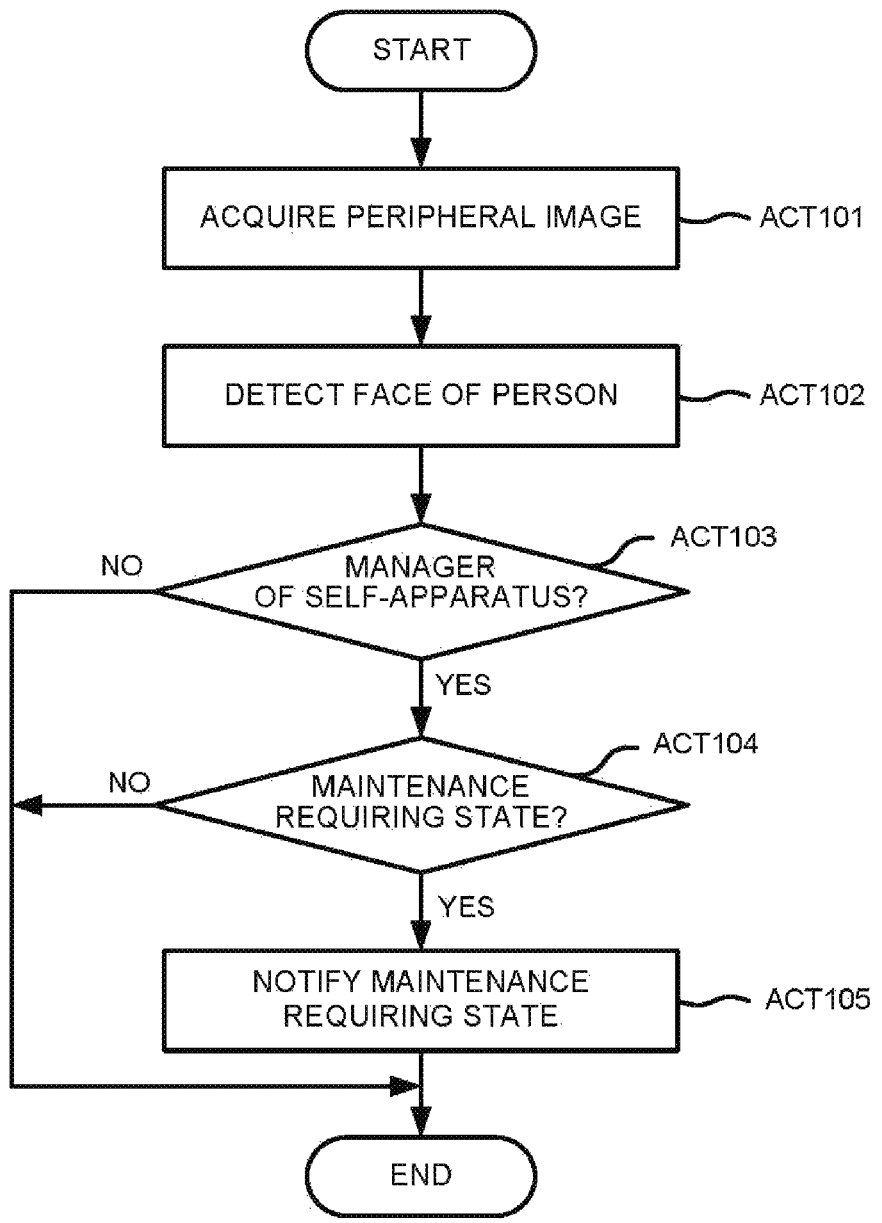

INFORMATION PROCESSING APPARATUS AND CONTROL METHOD

CROSS-REFERENCE TO RELATED APPLICATION

This application is based upon and claims the benefit of priority from Japanese Patent Application No. 2015-233991, filed Nov. 30, 2015, the entire contents of which are incorporated herein by reference.

FIELD

Embodiments described herein relate generally to an information processing apparatus and a control method.

BACKGROUND

In an information processing apparatus such as an image forming apparatus, a maintenance work for replacing or restocking consumable items such as sheets, toner and the like or for maintaining the apparatus is required. In such a case, the information processing apparatus executes an operation (hereinafter, referred to as an "informing operation") for informing or notifying a user that the self-apparatus needs the maintenance work. For example, the information processing apparatus executes the informing operation such as display of a message, an output of sound or lighting of an indicator. In recent years, the information processing apparatus can execute the informing operation if a person is detected in the periphery of the apparatus. However, the conventional information processing apparatus does not identify a person serving as an informing target. Therefore, the apparatus executes the informing operation to a user who does nothing for the maintenance work.

DESCRIPTION OF THE DRAWINGS

FIG. 2 illustrates block diagram of the image forming apparatus 100 according to the embodiment;

FIG. 3 illustrates first feature information;

FIG. 4 illustrates state information;

FIG. 5 is a flowchart illustrating the flow of an informing processing executed by the image forming apparatus 100 according to a first embodiment;

DETAILED DESCRIPTION

In accordance with an embodiment, an information processing apparatus comprises an imaging device, a storage device, a notification device and a controller. The imaging device configured to acquire a peripheral image of the information processing apparatus. The storage device configured to store maintenance information indicating a status of the apparatus for a maintenance. The controller is configured to detect a face of a person based on the peripheral image acquired by the imaging device, to determine whether the detected person is a manager of the information processing apparatus, and to control the notification device to inform the maintenance information read from the storage device if the detected person is determined as the manager of the information processing apparatus.

Hereinafter, an embodiment of the information processing apparatus and a control method is described with reference to the accompanying drawings.

First Embodiment

Figure 1:
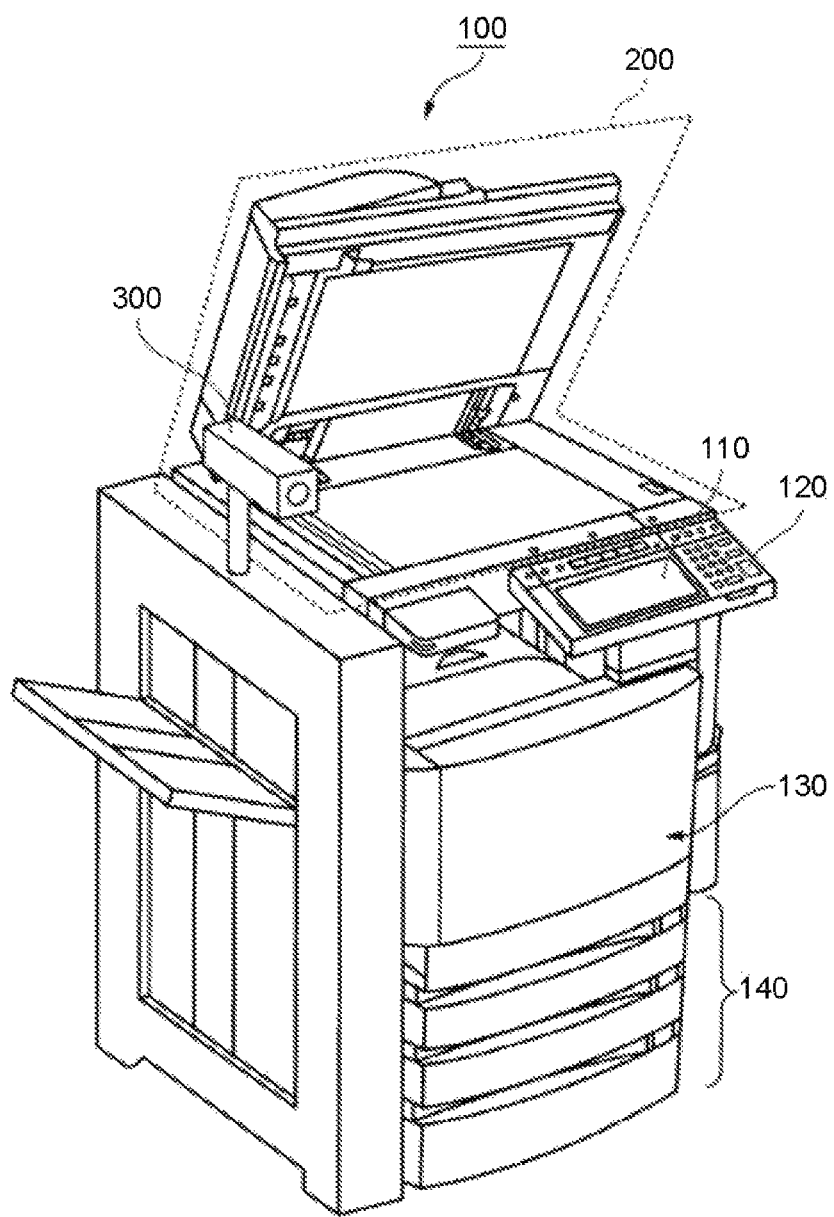
FIG. 1 illustrates an external view of an image forming apparatus 100 according to an embodiment.

FIG. 1 illustrates an external view of an image forming apparatus 100 serving as an information processing apparatus according to the embodiment. The image forming apparatus 100 is, for example, a multifunctional device. The image forming apparatus 100 has a display 110, a control panel 120, a printer section 130, a sheet housing section 140, an image reading section 200 and an image capturing device 300. Further, the printer section 130 may be an electrophotographic-type device for using a toner or an inkjet-type device.

The image forming apparatus 100 uses a developing agent such as toner to form an image on a sheet. The sheet is, for example, a paper or a label paper. The sheet may be an optional object as long as the image forming apparatus 100 can form an image on a surface thereof.

The display 110 may be an image display device such as a liquid crystal display, an organic EL (Electro Luminescence) display and the like. The display 110 displays various kinds of information relating to the image forming apparatus 100. The display 110 serves as a notification device. The notification device may alternatively or additionally include a speaker which makes sounds and an indicator which emits light and the like.

The control panel 120 includes a plurality of buttons. The control panel 120 receives a user operation. The control panel 120 outputs a signal corresponding to the user operation to a control section (controller) of the image forming apparatus 100. Further, the display 110 and the control panel 120 may be integrated as a touch panel.

The printer section 130 forms an image on the sheet based on image information received via a communication path or image information generated by the image reading section 200. The printer section 130 forms an image through, for example, the following processing. The printer section 130 forms an electrostatic latent image on a photoconductive drum based on the image information. The printer section 130 forms a visible image through attaching the developing agent to the electrostatic latent image. The printer section 130 transfers the visible image on the sheet. The printer section 130 fixes the visible image on the sheet through heating and pressurizing the sheet. Further, the sheet on which the image is formed may be a sheet housed in a sheet housing section 140 or a sheet that is manually inserted.

The sheet housing section 140 houses the sheet used in the image formation in the printer section 130.

The image reading section 200 has light source and CCD (Charge-Coupled Device) or CMOS sensor, and reads image formed on the original as the intensity of the light. The image reading section 200 stores the read image information. The stored image information may be sent to another information processing apparatus via a network. The stored image information may be used to form an image on the sheet through the printer section 130.

An image capturing device (imaging device) 300 such as a camera photographs or records the periphery of the image forming apparatus 100. The image capturing device 300, for example, is arranged at the upper portion of the image forming apparatus 100, as shown in FIG. 1. The image capturing device 300 continuously or intermittently takes a peripheral image of the image forming apparatus 100 at a prescribed period. The image capturing device 300 outputs the peripheral image to the image forming apparatus 100. Further, the arrangement of the image capturing device 300 is not necessarily limited to a mode in which the image capturing device 300 is mounted in the image forming apparatus 100 as long as the periphery of the image forming apparatus 100 can be photographed thereby. For example, the image capturing device 300 can be connected with the image forming apparatus 100 via a communication cable or a wireless, and may be arranged on a ceiling or a wall inside the room in which the image forming apparatus 100 is located.

FIG. 2 illustrates a block diagram of the image forming apparatus 100 according to the embodiment. The image forming apparatus 100 includes a controller having a CPU (Central Processing Unit) and a memory and an auxiliary storage device connected via a bus line. The memory stores some programs which operate each section and device of the image forming apparatus 100. The controller (CPU), through executing the program, controls a feature information storage section 101, a state information storage section 102, a peripheral image acquisition section 103, a first detection section 104 (detector), a manager determination section 105 and an informing section 106. Further, all or a part of functions of the image forming apparatus 100 may be realized by using hardware such as an ASIC (Application Specific Integrated Circuit), a PLD (Programmable Logic Device) or an FPGA (Field Programmable Gate Array). The program may be recorded in a computer-readable recording medium. The computer-readable recording medium refers to a storage device such as a portable medium, for example, a flexible disc, a magnetic optical disk, a ROM, a CD-ROM, or a hard disk built-in the computer system. The program may be sent via an electrical or optical communication line. In this embodiment, the controller of the image forming apparatus serves as the peripheral image acquisition section 103, the first detection section 104, a manager determination section 105. The notification device, for example the display 110, serves as the informing section 106.

The feature information storage section 101 and the state information storage section 102 each include a storage device such as a magnetic hard disk device, a semiconductor storage device and the like. The feature information storage section 101 stores feature information indicating features of a face of a manager/administrator of the self-apparatus in advance. The feature information may be generated with any one of the existing methods as long as it is the information indicating the feature of the face and can be subjected to the numerical comparison. For example, the first feature information is indicated by a plurality of positions of feature points extracted from an image obtained by photographing the face of the manager.

Further, the state information storage section 102 stores state information indicating whether or not the self-apparatus is in a state in which the maintenance is required (hereinafter, referred to as a "maintenance requiring state"). The state information is updated in response to the change of the state of the self-apparatus by the control section (controller) of the image forming apparatus 100.

The peripheral image acquisition section 103 acquires the peripheral image from the image capturing section 300. The peripheral image acquisition section 103 outputs the acquired peripheral image to the first detection section 104.

The first detection section 104 acquires the peripheral image from the peripheral image acquisition section 103.

The first detection section 104 detects a face of a person from the acquired peripheral image. The method with which the first detection section 104 detects the face of the person from the peripheral image may use any one of the existing face recognition technologies.

The manager determination section 105 determines whether or not the person whose face is detected from the peripheral image by the first detection section 104 is the manager of the self-apparatus. Specifically, the manager determination section 105 acquires the feature information (hereinafter, referred to as "first detection information") based on the face image of the detected person extracted from the peripheral image. The manager determination section 105 determines whether or not the detected person is the manager based on the first detection information and the feature information (hereinafter, referred to as "first feature information") indicating the features based on the face image of the manager of the self-apparatus stored in the feature information storage section 101 in advance. The informing section 106 informs the manager of the information relating to the maintenance of the self-apparatus (hereinafter, referred to as "maintenance information") based on a result of the determination of the manager determination section 105.

FIG. 3 illustrates the first feature information. For example, the first feature information is maintained as a first feature information table 1011 shown in FIG. 3. The first feature information table 1011 includes first feature information records for each manager ID. The first feature information record includes the manager ID and each value of the feature information. The manager ID indicates identification information of the manager of the image forming apparatus 100. The feature information indicates the first feature information of the manager identified with the manager ID.

FIG. 4 illustrates the state information. For example, the state information is maintained as a state information table 1021 shown in FIG. 4. The state information table 1021 includes state information records for each state ID. The state information record includes the state ID, a flag and each value of corresponding members. The state ID and the flag indicate whether the state of the image forming apparatus 100 associated with the corresponding member is the maintenance requiring state. The state ID refers to identification information of the maintenance requiring state of the image forming apparatus 100. The flag indicates whether or not the self-apparatus is in the maintenance requiring state identified with the state ID. The corresponding member indicates a replaceable, restock or consumable member/item of which the maintenance is required in the maintenance requiring state identified with the state ID. For example, the corresponding member includes at least one of toner, sheets, staples, photosensitive drum and roller.

FIG. 5 is a flowchart illustrating the flow of a processing (hereinafter, referred to as an "informing processing") in which the image forming apparatus 100 according to the first embodiment informs the manager of the maintenance information.

First, the peripheral image acquisition section 103 of the image forming apparatus 100 acquires the peripheral image from the image capturing device 300 (ACT 101). The peripheral image acquisition section 103 outputs the acquired peripheral image to the first detection section 104. The first detection section 104 acquires the peripheral image from the peripheral image acquisition section 103. The first detection section 104 detects a face of a person from the acquired peripheral image (ACT 102). Specifically, the first detection section 104 extracts points (hereinafter, referred to as a "feature point") indicating features of the face of the person from the peripheral image to detect the face of the person from the peripheral image. The first detection section 104 outputs information indicating the feature point extracted from the peripheral image as the first detection information to the manager determination section 105.

Next, the manager determination section 105 determines whether or not the person detected from the peripheral image by the first detection section 104 is a manager of the self-apparatus (ACT 103). Specifically, the manager determination section 105, based on the first feature information stored in the feature information storage section 101 in advance and the first detection information acquired by the first detection section 104, determines whether or not the person detected by the first detection section 104 is a manager of the self-apparatus. For example, by comparing the first feature information with the first detection information, the manager determination section 105 acquires a correspondence degree between the feature of the face of the detected person from the peripheral image and the feature of the face of the manager. The manager determination section 105, through comparing the acquired correspondence degree with a prescribed threshold value, determines whether or not the detected person from the peripheral image is the manager of the self-apparatus.

If it is determined that the detected person from the peripheral image is not the manager of the self-apparatus (ACT 103: No), the manager determination section 105 terminates the informing processing. On the other hand, if it is determined that the detected person from the peripheral image is the manager of the self-apparatus (ACT 103: Yes), the manager determination section 105 outputs the result of the determination to the informing section 106. The informing section 106 determines whether or not the self-apparatus is in the maintenance requiring state (ACT 104), and informs the manager of the maintenance information based on the result of the determination.

For example, the informing section 106 refers to the state information table 1021 to select a state information record the value of the flag of which is "1". The informing section 106, if the state information record satisfying the condition is selected, determines that the self-apparatus is in the maintenance requiring state. On the other hand, if the state information record satisfying the condition is not selected, the informing section 106 determines that the self-apparatus is not in the maintenance requiring state.

If it is determined that the self-apparatus is not in the maintenance requiring state (ACT 104: No), the informing section 106 terminates the informing processing. On the other hand, if it is determined that the self-apparatus is in the maintenance requiring state (ACT 104: Yes), for example, the informing section 106 informs the manager that the self-apparatus is in the maintenance requiring state as the maintenance information (ACT 105). Herein, no limitations are given to the method with which the informing section 106 informs the manager of the maintenance information. For example, the informing section 106 may inform the manager of the maintenance information through the output of a buzzer sound or blinking of an LED (Light Emitting Diode). In this case, the informing section 106 may express contents of the maintenance information informed to the manager through an output pattern of the buzzer sound or a blinking pattern of the LED. Further, the informing section 106 may inform the manager of the maintenance information through displaying the contents relating to the state information in which the flag in the state information table 1021 is "1" on the display 110.

The image forming apparatus 100 with such a structure of the first embodiment detects the manager from the peripheral image obtained by photographing the periphery of the self-apparatus, and informs the detected manager of the information relating to the maintenance of the self-apparatus. Through such a function, in the image forming apparatus 100 of the first embodiment, as the maintenance requiring state of the self-apparatus can be informed to the right person (that is, the manager), the maintenance work of the self-apparatus can be more efficiently executed.

Further, the image forming apparatus 100 of the first embodiment informs the manager standing around the self-apparatus. Thus, in a case of executing the informing operation through the output of the sound, it is possible to prevent the notification to a person inexperienced in the maintenance who passes by the periphery of the self-apparatus. Further, it is possible to prevent a job or work of the person standing around the self-apparatus from being hindered through continuously outputting the sound inside the room where the self-apparatus is installed.

Second Embodiment

Figures 6, 7:
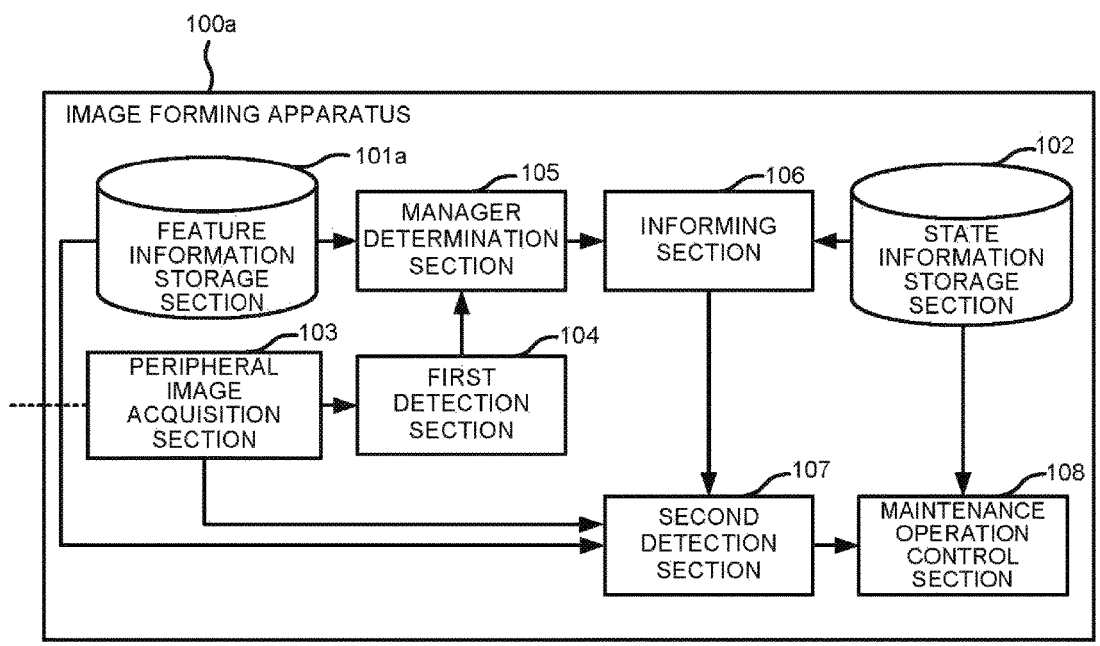
FIG. 6 illustrates block diagram of an image forming apparatus 100a according to a second embodiment.
FIG. 7 illustrates second feature information.

FIG. 6 is diagram illustrating the example of functional components of an image forming apparatus 100a according to the second embodiment. The image forming apparatus 100a is different from the image forming apparatus 100 of the first embodiment in that the image forming apparatus 100a is equipped with a feature information storage section 101a instead of the feature information storage section 101, a second detection section 107 (detector) and a maintenance operation controller 108. The other functional sections are the same as that of the image forming apparatus 100. Thus, the functional sections other than the feature information storage section 101a, the second detection section 107 and the maintenance operation controller 108 are applied with the same numerals as FIG. 2 and the description thereof is omitted in the following.

As with the first embodiment, the controller (CPU), through executing the program, controls each section of the FIG. 6.

The feature information storage section 101a further stores second feature information in advance in addition to the first feature information. The second feature information indicates features of members (hereinafter, referred to as a "maintenance member") relating to the maintenance of the self-apparatus. The second feature information may be generated with any one of the existing methods as long as it is the information indicating the feature of the maintenance member and can be subjected to the numerical comparison. For example, the second feature information is indicated by a plurality of positions of feature points extracted from an image obtained by capturing the maintenance member.

The second detection section 107 acquires the peripheral image from the peripheral image acquisition section 103. The second detection section 107 detects the maintenance member from the acquired peripheral image. The method with which the second detection section 107 detects the maintenance member from the peripheral image may use anyone of the existing image recognition technologies.

The maintenance operation controller 108 is a functional section for controlling the maintenance operation of the self-apparatus. The maintenance operation refers to an operation relating to the maintenance of the self-apparatus, for example, an operation of opening a cover of a part where the replacement of the maintenance member is required. In this case, the image forming apparatus 100a is equipped with a drive section (not shown) such as a motor or a solenoid coil for controlling the operation of the cover in advance. The maintenance operation controller 108 is capable of controlling an opening and closing operation of the cover by controlling the current or voltage applied to these drive sections. The maintenance operation may be any other operation as long as the operation relates to the maintenance of the self-apparatus. For example, the maintenance operation may be an operation such as pretreatment required for replacement of the maintenance member. The maintenance operation controller 108 controls, based on the result of the determination of the manager determination section 105 and a detection result of the second detection section 107, the maintenance operation of the apparatus.

FIG. 7 is diagram illustrating the example of the second feature information. For example, the second feature information is maintained as a second feature information table 1012 shown in FIG. 7. The second feature information table 1012 includes second feature information records for each maintenance member ID. The second feature information record includes the maintenance member ID and each value of the feature information. The maintenance member ID indicates identification information of the maintenance member. The feature information indicates the second feature information of the maintenance member identified with the maintenance member ID.

Figure 8:
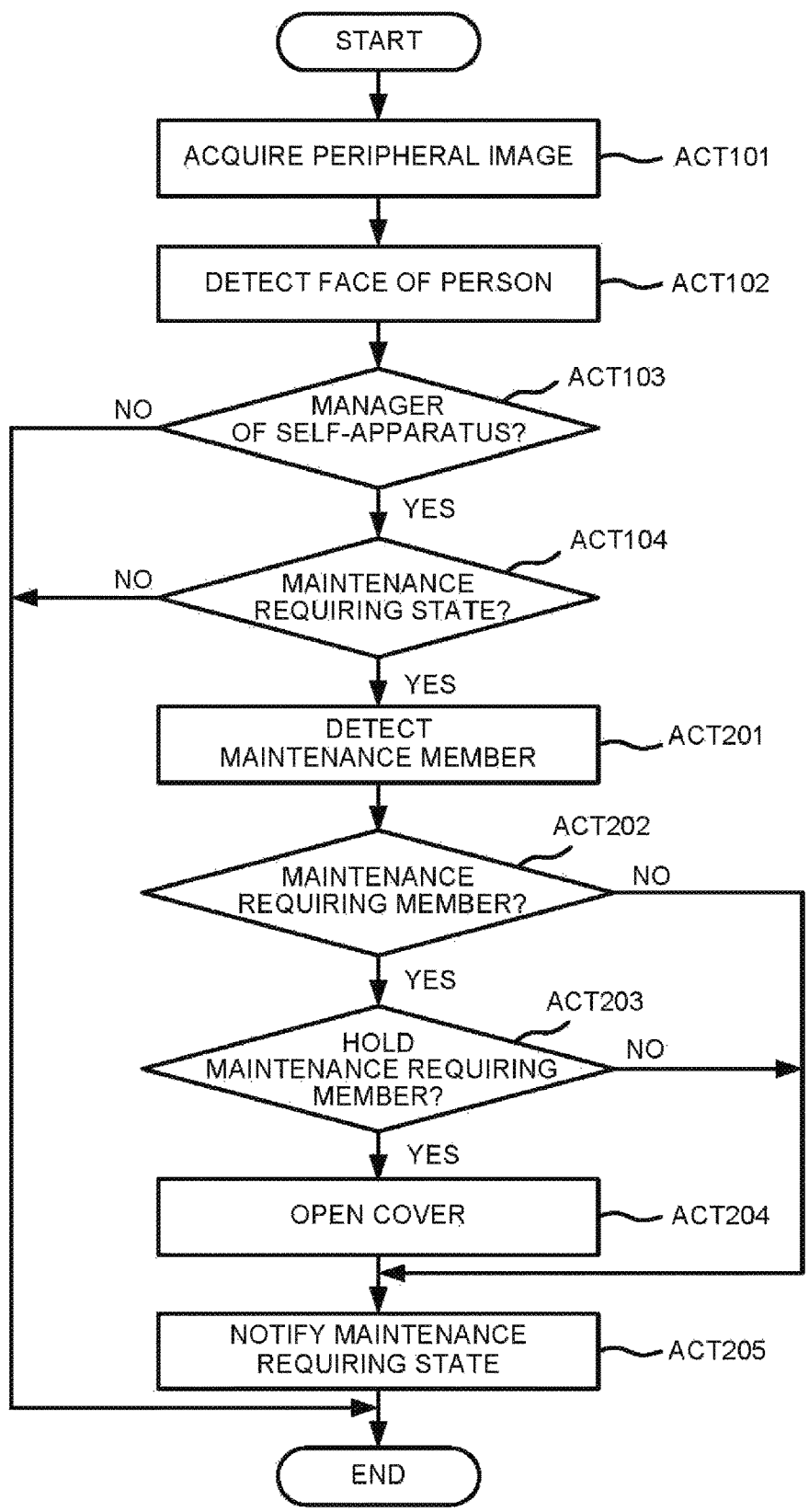
FIG. 8 is a flowchart illustrating the flow of an informing processing executed by the image forming apparatus 100a according to the second embodiment.

FIG. 8 is a flowchart illustrating the flow of the informing processing executed by the image forming apparatus 100a according to the second embodiment. Further, a part of the processing shown by the flowchart in FIG. 8 is the same as that shown by the flowchart in FIG. 5. Thus, the same processing is applied with the same numerals shown in FIG. 5, and the description thereof is omitted in the following.

If it is determined by the informing section 106 that the self-apparatus is not in the maintenance requiring state (ACT 104: No), the informing section 106 terminates the informing processing. On the other hand, If it is determined by the informing section 106 that the self-apparatus is in the maintenance requiring state (ACT 104: Yes), the second detection section 107 detects the maintenance member from the peripheral image (ACT 201).

Specifically, the second detection section 107 extracts second detection information indicating features of the maintenance member from the peripheral image. The maintenance operation controller 108 refers to the second feature information table 1012 to acquire the feature information of each maintenance member. The maintenance operation controller 108 acquires a correspondence degree between the feature information acquired as the second feature information and the second detection information. The maintenance operation controller 108, through comparing the acquired the correspondence degree with a prescribed threshold value, identifies that the maintenance member detected from the peripheral image is which of the maintenance members. The second detection section 107 notifies the maintenance operation controller 108 of the maintenance member ID detected from the peripheral image.

Next, the maintenance operation controller 108 determines whether or not the maintenance member detected from the peripheral image is a maintenance member (hereinafter, referred to as a "maintenance requiring member") of the self-apparatus which is required for maintenance (ACT 202). Specifically, the maintenance operation controller 108 refers to the state information table 1021 to determine whether or not the flag corresponding to maintenance member ID notified from the second detection section 107 is "1". If it is determined that the flag corresponding to the maintenance member ID notified from the second detection section 107 is not "1", the maintenance operation controller 108 determines that the maintenance member identified with the maintenance member ID is not the maintenance requiring member. On the other hand, the flag corresponding to the maintenance member ID notified from the second detection section 107 is "1", the maintenance operation controller 108 determines that the maintenance member identified with the maintenance member ID is the maintenance requiring member.

If it is determined that the maintenance member detected from the peripheral image is not the maintenance requiring member (ACT 202: No), the maintenance operation control section 108 proceeds to the processing in ACT 105. On the other hand, if it is determined that the maintenance member extracted from the peripheral image is the maintenance requiring member (ACT 202: Yes), the maintenance operation controller 108 determines whether or not the manager detected from the peripheral image holds the maintenance requiring member (ACT 203).

For example, the maintenance operation controller 108 determines whether or not the distance between the manager detected from the peripheral image and the maintenance requiring member is equal to or lower than a prescribed threshold value. If the distance between the manager and the maintenance requiring member is greater than the prescribed threshold value, the maintenance operation controller 108 determines that the manager does not hold the maintenance requiring member. On the other hand, if the distance between the manager and the maintenance requiring member is equal to or lower than the prescribed threshold value, the maintenance operation controller 108 determines that the manager holds the maintenance requiring member.

If it is determined that the manager detected from the peripheral image does not hold the maintenance requiring member (ACT 203: No), the maintenance operation controller 108 proceeds to the processing in ACT 105. On the other hand, if it is determined that the manager detected from the peripheral image holds the maintenance requiring member (ACT 203: Yes), the maintenance operation controller 108 enables the self-apparatus to execute the maintenance operation. For example, the maintenance operation controller 108 enables the self-apparatus to execute the operation of opening the cover of a part where the replacement of the maintenance requiring member is required (ACT 204).

The image forming apparatus 100a with such a structure of the second embodiment executes the maintenance operation if the manager holds the maintenance requiring member in the informing processing for informing the maintenance information of the self-apparatus. Through such a function, the image forming apparatus 100a can reduce the load relating to the maintenance of the manager. In other words, the image forming apparatus 100a of the second embodiment can more efficiently execute the maintenance work of the self-apparatus.

Hereinafter, modifications of the image forming apparatus of the embodiment are described.

The image forming apparatus 100 may inform the maintenance information depending on the manager detected from the peripheral image. Further, the image forming apparatus 100 determines whether to inform the maintenance information depending on the manager detected from the peripheral image. For example, the image forming apparatus 100 may inform the maintenance information if a manager who can execute the maintenance on the maintenance requiring state of the self-apparatus is detected.

Further, the image forming apparatus 100 may include a function of storing the manager who executes the maintenance. In this case, the image forming apparatus 100 stores the manager who executes the maintenance and the type of the maintenance executed by the manager in an association manner. The image forming apparatus 100 may inform the manager of the maintenance information if the manager detected from the peripheral image is associated with the type of the maintenance depending on the maintenance requiring state of the self-apparatus.

The first feature information may be generated in the image forming apparatus 100. In this case, for example, the image forming apparatus 100 generates the first feature information as follows. First, the image forming apparatus 100 detects a face of a person from an image captured by the image capturing section 300. The image forming apparatus 100 receives input of selection of a person registered as the manager from the detected persons via the control panel 120. Next, the image forming apparatus 100 receives the input of the manager ID associated with the selected person via the control panel 120. The image forming apparatus 100 associates the feature information of the face of the selected person with the input manager ID to generate the first feature information and stores the first feature information in the feature information storage section 101.

The image forming apparatus 100 may generate the first feature information without the operation of the person. In this case, for example, the image forming apparatus 100 generates the first feature information as follows. First, the image forming apparatus 100 detects a face of a user who stands in front of the self-apparatus and uses the self-apparatus from the image captured by the image capturing section 300. For example, the image forming apparatus 100 may determine whether or not the user stands in front of the self-apparatus according to the size of the face of the person detected from the image. The image forming apparatus 100 associates the feature information of the face of the detected person with the identification information of the user who is using the self-apparatus to generate the first feature information and stores the first feature information in the feature information storage section 101.

The state of the manager serving as the condition for enabling the self-apparatus to execute the maintenance operation by the image forming apparatus 100a is not limited to whether or not the manager holds the maintenance requiring member. For example, the image forming apparatus 100a, if the manager stands within a prescribed range from the self-apparatus, may enable the self-apparatus to execute the maintenance operation.

The method for detecting the manager in the periphery of the self-apparatus by the image forming apparatus 100 or 100a is not limited to a mode of detecting the manager from the peripheral image. For example, the image forming apparatus 100 or 100a may detect the manager in the periphery of the self-apparatus through detecting a signal such as a beacon issued from a terminal held by the manager.

In accordance with at least one mentioned-above embodiment, through the function of detecting the manager standing in the periphery of the self-apparatus and a function of informing the detected manager of the information relating to the maintenance of the self-apparatus, the maintenance work of the self-apparatus can be more efficiently executed.

The function of detecting the manager standing in the periphery of the self-apparatus and a function of informing the detected manager of the information relating to the maintenance of the self-apparatus are also applicable in an information processing apparatus other than the image forming apparatus.

While certain embodiments are described, these embodiments are presented byway of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An information processing apparatus, comprising:
an imaging device that acquires a peripheral image of the information processing apparatus;
a storage device that stores state information indicating a status of the information processing apparatus; and
a controller that
detects a face of a person from the peripheral image acquired by the imaging device,
detects, from the peripheral image, a maintenance member which is a replaceable, restock or consumable member or item which is required in a maintenance requiring state in which maintenance is required,
determines whether the detected person is an administrator of the information processing apparatus,
determines whether the information processing apparatus is in the maintenance requiring state based on the state information,
determines whether the detected maintenance member is a maintenance requiring member which is required for a maintenance of the information processing apparatus in the maintenance requiring state, and
enables the information processing apparatus to execute a maintenance operation corresponding to the detected maintenance member if it is determined that the detected person is the administrator, that the information processing apparatus is in the maintenance requiring state and that the detected person holds the detected maintenance member.

2. The information processing apparatus according to claim 1, wherein
the storage device further stores association information indicating association between administrators and types of maintenances having been executed by administrators, and
wherein the controller
further determines whether the person determined to be the administrator is associated with the one or more types of maintenances corresponding to a state of the information processing apparatus determined to be in the maintenance requiring state, and
controls the notification device to notify a maintenance information informing that the information processing apparatus is in the maintenance requiring state if it is determined that the person determined to be the administrator is associated with the one or more types of maintenances corresponding to a state of the information processing apparatus determined to be in the maintenance requiring state.

3. The information processing apparatus according to claim 2, wherein the storage device further stores feature information indicating features data acquired based on a face image of the administrator, and
wherein the controller determines whether the detected person is the administrator by comparing the feature information with detection information,
wherein the detection information is an information indicating features data acquired based on a face image of the detected person, and
wherein the face image of the detected person is an image extracted from the peripheral image.

4. The information processing apparatus according to claim 3, wherein
the state information further indicates association between state IDs of the maintenance requiring status and the maintenance member,
wherein the maintenance member is to be used for the maintenance of the information processing apparatus in the maintenance requiring state identified based on the state IDs, and
wherein the controller
further determines whether the detected maintenance member is the maintenance requiring member by determining whether the detected maintenance member is associated with the one of the state IDs.

5. A control method performed by an information processing apparatus that comprises a storage device storing state information indicating a status of the information processing apparatus, the control method comprising:
acquiring a peripheral image of an information processing apparatus;
detecting a face of a person from the peripheral image;
detecting, from the peripheral image, a maintenance member which is a replaceable, restock or consumable member or item which is required in a maintenance requiring state in which maintenance is required;
determining whether the detected person is an administrator of the information processing apparatus;
determining whether the information processing apparatus is in the maintenance requiring state based on the state information,
determining whether the detected maintenance member is a maintenance requiring member which is required for a maintenance of the information processing apparatus in the maintenance requiring state, and
enabling the information processing apparatus to execute a maintenance operation corresponding to the detected maintenance member if it is determined that the detected person is the administrator, that the information processing apparatus is in the maintenance requiring state and that the detected person holds the detected maintenance member.

6. The control method according to claim 5, wherein the storage device further stores association information indicating association between administrators and types of maintenances having been executed by the administrators, further comprising:
determining whether the person determined to be the administrator is associated with the one or more types of maintenances corresponding to a state of the information processing apparatus determined to be in the maintenance requiring state; and
controlling the notification device to notify a maintenance information informing that the information processing apparatus is in the maintenance requiring state if it is determined that the person determined to be the administrator is associated with the one or more types of maintenances corresponding to a state of the information processing apparatus determined to be in the maintenance requiring state.

7. The control method according to claim 6,
wherein the storage device further stores feature information indicating features data acquired based on a face image of the administrator, and
wherein the determination whether the detected person is the administrator is made by comparing the feature information with detection information,
wherein the detection information is an information indicating features data acquired based on a face image of the detected person, and
wherein the fame image of the detected person is an image extracted from the peripheral image.

8. The control method according to claim 7,
wherein the state information further indicates an association between state IDs of the maintenance requiring status and maintenance member,
wherein the maintenance member is to be used for the maintenance of the information processing apparatus in the maintenance requiring state identified based on the state IDs, and
wherein the determination whether the detected maintenance member is the maintenance requiring member by determining whether the detected maintenance member is associated with the one of the state IDs.

9. An information processing system for informing a notification via a notification device of an information processing apparatus, comprising:
an imaging device that acquires a peripheral image of the information processing apparatus;
a storage device that stores state information indicating a status of the information processing apparatus;
a detector that detects a face of a person in the peripheral image acquired by the imaging device;
a controller that
determines whether the detected person is an administrator of the information processing apparatus,
determines whether the information processing apparatus is in the maintenance requiring state based on the state information,
determines whether the detected maintenance member is a maintenance requiring member which is required for a maintenance of the information processing apparatus in the maintenance requiring state, and
enables the information processing apparatus to execute a maintenance operation corresponding to the detected maintenance member if it is determined that the detected person is the administrator, that the information processing apparatus is in the maintenance requiring state and that the detected person holds the detected maintenance member.

10. The information processing system according to claim 9, wherein
the storage device further stores association information indicating association between administrators and types of maintenances having been executed by the administrators, and
wherein the controller
further determines whether the person determined to be the administrator is associated with the one or more types of maintenances corresponding to a state of the information processing apparatus determined to be in the maintenance requiring state, and
controls the notification device to notify a maintenance information informing that the information processing apparatus is in the maintenance requiring state if it is determined that the person determined to be the administrator is associated with the one or more types of maintenances corresponding to a state of the information processing apparatus determined to be in the maintenance requiring state.

11. The information processing system according to claim 10, wherein
the storage device further stores feature information indicating features data acquired based on a face image of the administrator, and
wherein the controller determines whether the detected person is the administrator by comparing the feature information with detection,
wherein the detection information is an information indicating features data acquired based on a face image of the detected person, and
wherein the face image of the detected person is an image extracted from the peripheral image.

12. The information processing system according to claim 11, wherein
the state information further indicates an association between state IDs of the maintenance requiring status and the maintenance member,
wherein the maintenance member is to be used for the maintenance of the information processing apparatus in the maintenance requiring state identified based on the state IDs, and
wherein the controller further determines whether the detected maintenance member is the maintenance requiring member by determining whether the detected maintenance member is associated with the one of the state IDs.

* * * * *